(12) United States Patent
Hildebrand

(10) Patent No.: US 10,201,928 B2
(45) Date of Patent: Feb. 12, 2019

(54) METHOD AND DEVICE FOR MACHINING A WORKPIECE, MORE PARTICULARLY FOR PRODUCING CUTTING TOOLS

(75) Inventor: Peter Hildebrand, Pfronten (DE)

(73) Assignee: SAUER GMBH LASERTEC, Pfronten (DE)

( * ) Notice: Subject to any disclaimer, the term of this patent is extended or adjusted under 35 U.S.C. 154(b) by 806 days.

(21) Appl. No.: 14/128,581

(22) PCT Filed: Jul. 9, 2012

(86) PCT No.: PCT/EP2012/063424
§ 371 (c)(1),
(2), (4) Date: Dec. 20, 2013

(87) PCT Pub. No.: WO2013/004850
PCT Pub. Date: Jan. 10, 2013

(65) Prior Publication Data
US 2014/0131922 A1    May 15, 2014

(30) Foreign Application Priority Data

Jul. 7, 2011   (DE) .......................... 10 2011 078 825

(51) Int. Cl.
*B23K 26/08* (2014.01)
*B29C 59/16* (2006.01)
(Continued)

(52) U.S. Cl.
CPC ............ *B29C 59/16* (2013.01); *B23K 26/082* (2015.10); *B23K 26/0884* (2013.01); *B23K 26/36* (2013.01); *B23K 2101/20* (2018.08)

(58) Field of Classification Search
CPC ........ B29C 59/16; B23K 26/035; B23K 26/36
See application file for complete search history.

(56) References Cited

U.S. PATENT DOCUMENTS 4,752,668 A * 6/1988 Rosenfield ................ G03F 1/72
219/121.68
5,068,514 A * 11/1991 Lunney .............. B23K 26/0075
219/121.66
(Continued)

FOREIGN PATENT DOCUMENTS

CN         1059096 A      3/1992
CN       101257993 A      9/2008
(Continued)

OTHER PUBLICATIONS

Chinese Search Report for Application No. 2012800427665, dated Jan. 9, 2015, 3 pages.
(Continued)

*Primary Examiner* — Matthew J Daniels
(74) *Attorney, Agent, or Firm* — Ziegler IP Law Group, LLC

(57) ABSTRACT

A method for machining a workpiece by means of a laser beam, in which material of the workpiece is removed layer-by-layer according to predetermined definitions to produce a workpiece by traversing the exposed workpiece surface in lengths across the entire surface with a laser beam in order to vaporize and/or combust workpiece material. In a first material removal phase, the laser beam is guided relative to the workpiece over the workpiece surface by adjustable mirrors inside the laser tool, more particularly without mechanical control axes being moved to adjust the relative position between the laser tool and the workpiece. In a second material removal phase, the laser beam is guided relative to the workpiece over the workpiece surface by means of one or more control axes of the machine, the focal length being variably adjustable by means of a variable optical unit.

12 Claims, 7 Drawing Sheets

(51) Int. Cl.
  *B23K 26/36* (2014.01)
  *B23K 26/082* (2014.01)
  *B23K 101/20* (2006.01)

(56) References Cited

U.S. PATENT DOCUMENTS

| | | | |
|---|---|---|---|
| 6,043,452 A * | 3/2000 | Bestenlehrer | B23K 26/0075 |
| | | | 219/121.62 |
| 6,331,177 B1 * | 12/2001 | Munnerlyn | A61F 9/00804 |
| | | | 128/898 |
| 2002/0162825 A1 | 11/2002 | Lizotte et al. | |
| 2006/0081573 A1 * | 4/2006 | Wissenbach | B23K 26/0075 |
| | | | 219/121.66 |
| 2007/0181542 A1 | 8/2007 | Hildebrand et al. | |
| 2011/0240617 A1 * | 10/2011 | Xu | B23K 26/00 |
| | | | 219/121.72 |

FOREIGN PATENT DOCUMENTS

| | | |
|---|---|---|
| DE | 10053742 A1 | 5/2002 |
| DE | 10352402 A1 | 6/2005 |
| EP | 2 314 412 A2 | 4/2011 |
| JP | 6297787 A | 5/1987 |
| JP | 6262379 A | 9/1994 |
| JP | H111333575 | 12/1999 |
| JP | 2007500081 A | 1/2007 |
| JP | 2008511975 A | 4/2008 |
| JP | 2011-098390 A | 5/2011 |
| JP | 2014517843 A | 7/2014 |
| KR | 10-2006-0013564 A | 2/2006 |
| WO | 2004/105996 A1 | 12/2004 |
| WO | 2013/004850 A1 | 1/2013 |

OTHER PUBLICATIONS

Chinese Office Action for Application No. 201280042766.5, dated Jan. 19, 2015, 8 pages.
Chinese Office Action for Application No. 201280042766.5, dated Dec. 9, 2015, 9 pages.
Notification of Reason of Refusal, Japan Patent Office, Application No. 2014517843, dated Jan. 5, 2016, 13 pages.
Office Action received for Korean Patent Application No. 10-2014-7000363, dated Jan. 13, 2015, 11 pages (including 5 pages of Machine Translation).
International Preliminary Report on Patentability; PCT/EP2012/063424; dated Jan. 7, 2014.

* cited by examiner

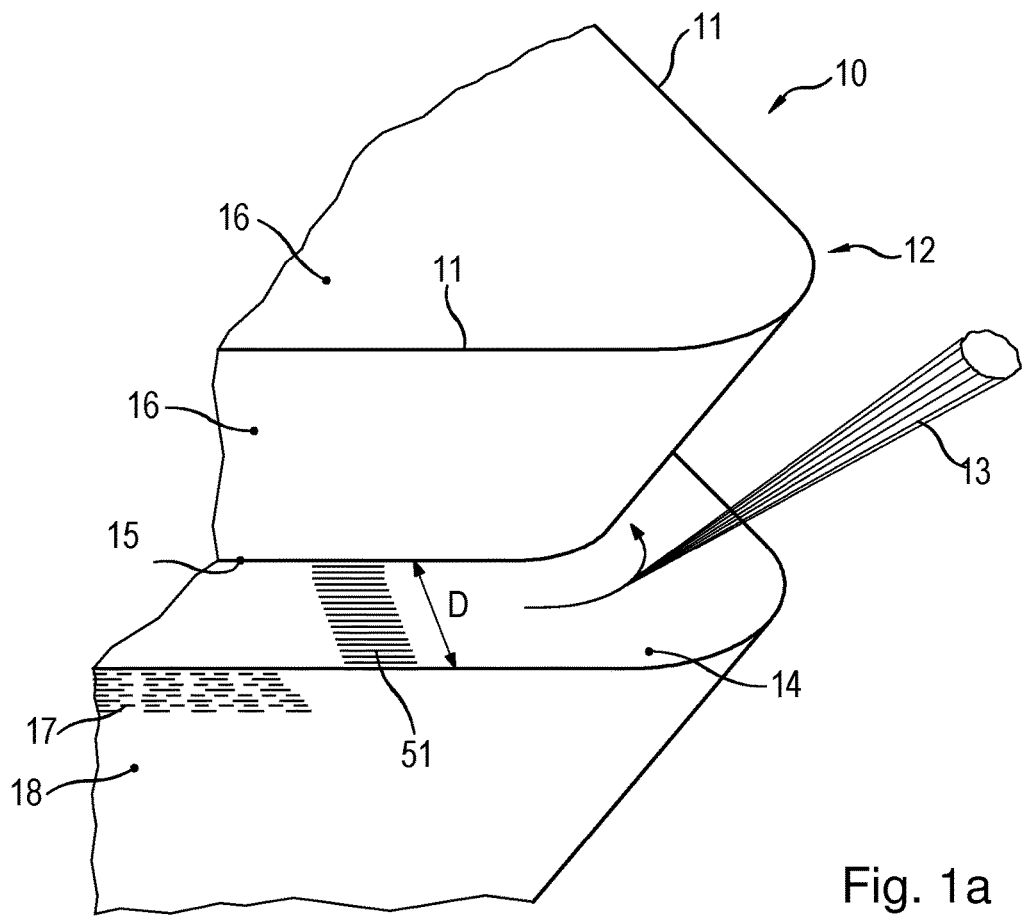
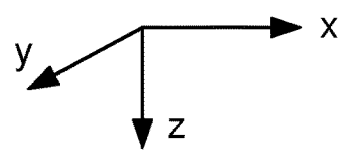
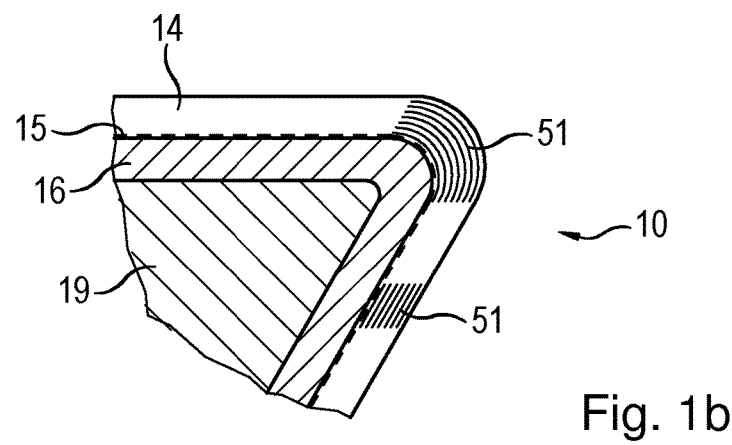
Fig. 1a
Fig. 1b

Fig. 4a
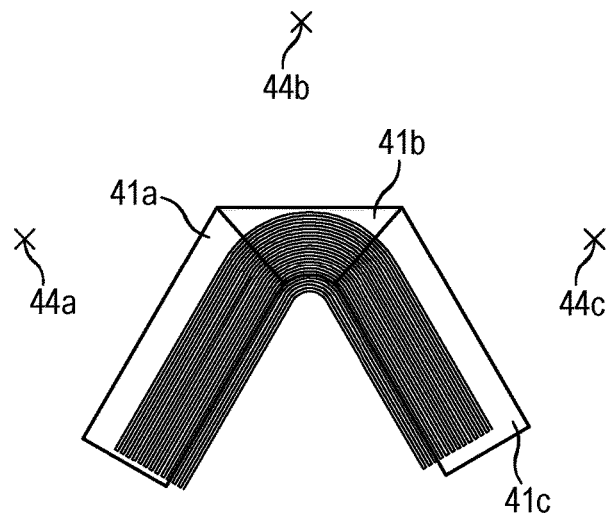
Fig. 4b
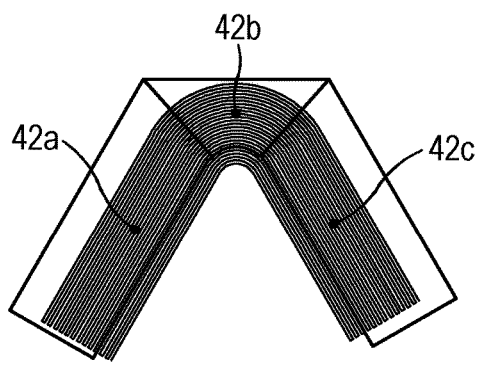
Fig. 4c
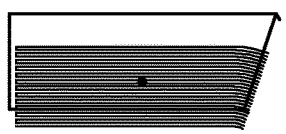
Fig. 4d1
Fig. 4d2
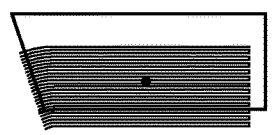
Fig. 4d3
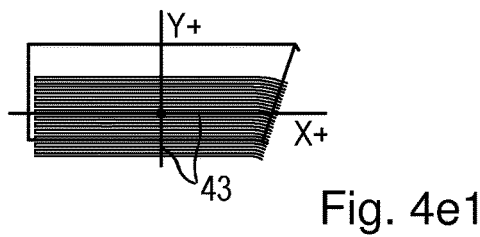
Fig. 4e1

METHOD AND DEVICE FOR MACHINING A WORKPIECE, MORE PARTICULARLY FOR PRODUCING CUTTING TOOLS

BACKGROUND

1. Field

The aspects of the disclosed embodiments relate to a method and a device for machining a workpiece, which can be advantageously used for producing cutting tools having diamond cutting edges, for example.

FIG. 1a and FIG. 1b shows the relationships by way of diagram. 10 denotes a workpiece. FIG. 1a shows by way of diagram and in perspective part thereof during the production while FIG. 1b is a sectional drawing. In FIG. 1b, 19 stands for a metallic basic body which is shaped in suitable fashion and as desired. It is coated with an artificially formed diamond layer which includes areas 14 and 16 between which a separating line 15 is shown. The diamond layer has been applied to the manufactured blank 19 and can be a CVD diamond layer (chemical vapor deposition) or a PKD diamond layer (polycrystalline diamond). Upon conclusion of the task, the thickness thereof is greater than required most recently and the form required most recently, including the cutting edge of the cutting tool, is produced by removing the excessive diamond material by means of a laser removal machine until the finally desired form including the cutting edge form has been obtained.

FIG. 1a shows by way of diagram and in perspective a partially manufactured cutting tool. The upper area is already fully manufactured, the edge 11 is the cutting edge of the cutting tool and has already been worked out in the machining stage as shown. It is assumed that the flanks of the cutting tool in the finally desired form still have to be produced downwardly by removing excessive diamond material. In FIG. 1b, this means that the material 14 is removed from the outside of the blank to the boundary 15, a process that is made in layers, wherein the layers are parallel to the drawing plane and are stacked perpendicularly thereto. In FIG. 1a, this is done by guiding a laser beam 13 over the accessible surface of the excessive material to liquefy and evaporate (also vapor expulsion of liquid droplets) or combust the material.

The guidance of the laser beam 13 over the accessible workpiece surface is done in strips in such a way that several lines, which lie next to one another, are traveled over sequentially so as to jointly cover a removed layer. In FIGS. 1a and 1b, these strips are designated by reference sign 51 while the layers still to be removed in future are outlined by the dashed lines 17. A layer of the material is removed by means of several strips which lie next to one another and border on one another and, and by removing several layers (in FIG. 1a stacked in the z-direction perpendicular to the drawing plane), the finally desired form of the workpiece is worked out of the blank.

FIG. 2a shows by way of diagram a laser machining machine. 10 again denotes the workpiece while 25 stands for a laser tool from which a focused, convergent laser beam 13 originates which is directed to the workpiece. 24 is a workpiece table and 23 is a machine support. 22a and 22b are translational and/or rotatory control axes by means of which relative positions (x, y, z) can be adjusted in three-dimensional fashion between tool and workpiece and by means of which alignments (phi, psi) of workpiece and tool relative to each other can also freely be adjusted. Depending on the type of machine and suitability, the control axes can be provided between machine frame 21 and the workpiece table 24 and/or between machine frame 21 and tool holder 23. Axes can be provided redundantly. It is preferred to provide at least three translational control axes and two rotatory control axes.

26 generally denotes sensors for detecting process parameters. They can also be designed for detecting the workpiece surface directly during the machining operation of the workpiece and can optionally also measure the workpiece in a three-dimensionally resolving fashion in a resolution corresponding to the finishing accuracy. 27 stands for a machine control system. It can be a digital process computer which can also be connected to a larger or smaller network. The control system is connected to a memory 28 which along with different other data also contains data which are required for generating the control signals for the laser tool 25, on the one hand, and the control axes 22, on the other hand. 29 denotes the interface between control system 27 and machine 20. It comprises, on the one hand, lines for signals and/or (switched, keyed) output and comprises in addition conversion devices (not shown) for format conversion, analog-to-digital conversion or digital-to-analog conversion and the like.

The laser tool 25 is shown in FIG. 2b. It is designed to guide the laser beam over the surface of the workpiece as desired while controlling the machine control system 27, in particular to travel over the strips 51 outlined in FIG. 1a. This can be done through controllable and adjustable mirrors 25a in a two-dimensional way. Moreover, a focusing adjustment 25b can be provided ("z-shifter") which follows the focus position of the laser beam 13 up to the work progress (in the z-direction in FIG. 1a), on the one hand, and to the crown in the case of a laser deflection, on the other hand.

However, in the production of workpieces to be produced in highly precise fashion, such as cutting tools having a diamond coating, the optical elements 25a have not been used for the beam guidance (adjustable mirrors) to date. The mechanical control axes 22a and 22b of the machine 20 have been used instead, while the laser beam 13 originated in stationary fashion in relation to the laser tool 25 from the latter.

The beam guidance of the laser by means of adjustable mirrors 25a has the advantage that it is comparatively fast. It serves for adjusting strip guidance speeds (moving speeds of the laser impact point or spot on the workpiece surface) of over 1 m/s up to 10 m/s and more. However, the drawback of this optical beam guidance is that it is rather inaccurate dynamic-wise, in particular often more inaccurate than the required tolerances. On the contrary, the beam guidance is much more accurate but also markedly slower when the relative guidance between laser tool 25 and workpiece 10 is not made via the adjustable mirrors 25a but via the mechanical control axes 22a and 22b (translational and/or rotatory, provided between machine frame 21 and tool support 23 and/or between machine frame 21 and workpiece table 24). In this case, accuracies of up to some few micrometers are possible. However, the achievable speeds are markedly slower in the case of a mechanical guidance. They are usually below 10 mm/s (strip guidance speed of the laser impact point on the workpiece surface). They are thus usually below those achievable with an optical beam guidance by a factor of at least 100, and therefore the production of workpieces are markedly prolonged.

2. Brief Description of Related Developments

In certain workpieces, e.g. cutting tools, a high degree of accuracy of the finished geometry is desirable, and therefore when the workpiece is produced by means of a laser, the use of the mechanical control axes 22a instead of the optical elements 25a is necessary for the laser beam guidance to achieve the desired accuracies. The comparatively slow and therefore long lasting operation is less disturbing when there is comparatively little overall material to be removed. In the case of cutting tools equipped with diamonds this is e.g. the case when the diamond coating consists of CVD diamonds since the thus produced coatings of the blank are comparatively thin and only have small protruding amounts of material, and therefore only relatively small volumes have to be removed.

However, it has turned out that is also desirable to produce workpieces, in which a comparatively large amount of material has to be removed, with a high degree of accuracy via the mechanical control axes. In the case of cutting tools having a diamond coating, these are e.g. PKD diamond coatings, the thicknesses of which are much greater than those of CD diamond coatings, and therefore the amount to be removed is correspondingly larger. Here, the production via the mechanical control axes for guiding the laser beam results in production periods which are only acceptable in exceptional cases.

EP 2314412 A2 describes a laser machining device for providing a blank with a contour, comprising a laser producing laser beam pulses, a deflection device which directs the laser beam pulses of the laser to predetermined impact points which are spaced apart from one another within a predetermined pulse area on the blank, and a positioning device which carries out a relative movement between the blank and the pulse area, wherein the relative movement proceeds in a relative movement direction along the edge and/or area to be produced.

SUMMARY

The object of the invention is to provide a laser machining method and a laser machining machine which allow the rapid and very accurate manufacture of workpieces.

This object is achieved by the features of the independent claims. The dependent claims are directed to preferred embodiments of the invention.

In general terms, a method for machining workpieces using a laser beam is provided which has different removal phases, wherein optical beam guidance and mechanical beam guidance are used with different weighting in the two removal phases, e.g. in such a way that in the first removal phase at least the optical beam guidance is used, optionally in combination with the mechanical beam guidance, and that in the second removal phase the mechanical beam guidance is preferably used exclusively.

A method for the machining of a workpiece in a machine using a laser beam from a laser tool, in which, for producing the workpiece by means of a laser beam, material of the workpiece is removed in layers in accordance with predetermined definitions by moving a laser beam over the exposed workpiece surface in strips and across the entire surface to evaporate and/or combust workpiece material, includes a first removal phase during which the laser beam is guided by means of variable optical devices, in particular adjustable mirrors inside the laser tool, in relation to the workpiece over the workpiece surface, with or without the simultaneous use of mechanical control axes for adjusting the relative position between the laser tool and the workpiece, and a second removal phase during which the laser beam is guided by means of one or a plurality of control axes of the machine in relation to the workpiece over the workpiece surface, preferably without the laser beam being simultaneously guided by means of variable optical devices, wherein the focal length can be variably adjustable by a variable optical device.

The first removal phase can be used to remove areas which are somewhat distant from and/or do not border directly on the final surface of the workpiece, while the second removal phase can be used to remove areas which are directly adjacent to and close to the final surface of the workpiece.

As a result of the use of the two removal phases, a bulk of excessive material can be removed comparatively rapidly in the first phase provided that it is distant from the finally desired workpiece surface by using a beam guidance (adjustable mirrors in the laser tool) to dynamically produce the majority of the relative movement between the laser impact point and the workpiece while at and close to the final desired surface in the second removal phase the mechanical beam guidance (by means of control axes of the machine) with fixed or bypassed optical beam guidance is used to be able to produce the workpiece near the surface slowly but accurately.

A laser machining machine for machining a workpiece includes a laser tool for guiding a laser beam which is designed to remove material of the workpiece in layers for the manufacture of workpieces in accordance with predetermined definitions by moving a laser beam over the exposed workpiece surface in strips and across the entire surface to evaporate and/or combust workpiece material, a workpiece table for holding a workpiece, several control axes for the translational and rotatory adjustment of the relative position and support of workpiece and laser tool relative to one another, and a control system for controlling the laser beam guidance in the laser tool and the control axes.

The control system is designed to guide in a first removal phase the laser beam by means of variable optical devices, in particular adjustable mirrors within the laser tool, relative to the workpiece over the workpiece surface with or without the simultaneous use of mechanical control axes for adjusting the relative position between laser tool and workpiece and to guide in a second removal phase the laser beam over the workpiece surface by means of one or a plurality of control axes of the machine relative to the workpiece, preferably without simultaneously guiding the laser beam by means of variable optical devices, wherein the focal length can be variably adjustable by a variable optical device.

To put it differently or more generally, a laser machining machine and in particular the control system thereof, is designed to carry out the machining methods described in this description.

A memory 28 is provided which stores relevant data. This data is in particular the parameters which are required for controlling the laser tool (in particular the variable optical elements therein), on the one hand, and the control axes 22a, 22b, on the other hand. This data can have been generated beforehand and stored in the memory device 28 or they can be generated in real time from superior data which can also be stored. In addition, the memory 28 also holds program data for implementable programs to carry out the necessary activities. The machine control 27 has interfaces towards the process, in particular for the signal reception of process sensors 26 and for the signal output to the process, in particular to the mechanical axes 22 and to the laser tool 25.

BRIEF DESCRIPTION OF THE DRAWINGS

With reference to the drawings, features and embodiments of the invention are described below.

FIG. 1 shows depictions of a workpiece for explaining machining situations and edge conditions, FIG. 4 shows a fragmentation of the accumulating removal in at least one of the phases.

DETAILED DESCRIPTION OF THE DISCLOSED EMBODIMENTS

Figure 3:
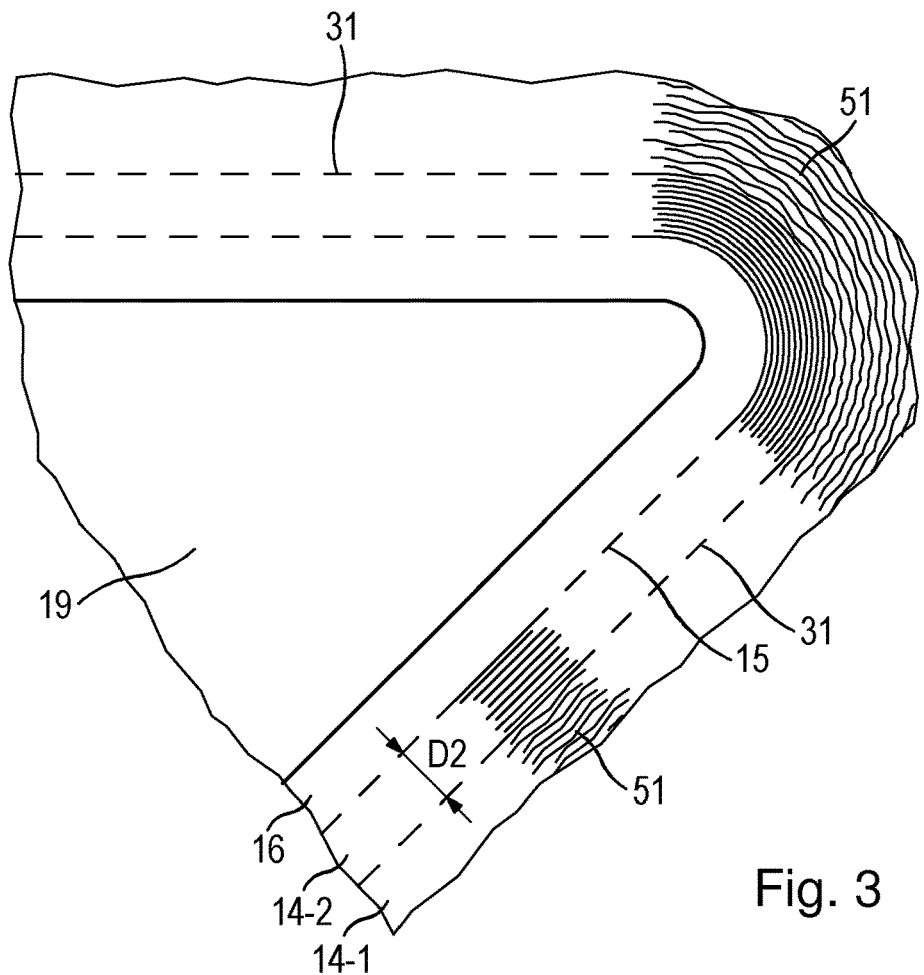
FIG. 3 shows an embodiment of a two-phase removal method.

FIG. 3 shows a two-phase removal method which uses the optical beam guidance in the first removal phase, possibly in overlap with the mechanical beam guidance, and only the mechanical beam guidance in the second removal phase. In connection with the method according to the invention, FIG. 3 shows a top view of a future workpiece surface as follows:

As to the quality, FIG. 3 corresponds to the depiction in FIG. 1b. 19 can be a metallic blank, for example, which in the embodiment as shown is not machined because it lies underneath a coating diamond layer 14, 16 which in the embodiment as shown can be a PKD diamond, for example. 15 denotes the machining boundary; material is to be removed from this point away from the metallic core (areas 14-1, 14-2) while the area 16 up to the metallic core 19 shall be left. The areas 14-1, 14-2 to be removed have two separate areas with a non-visible boundary 31 which is however implemented by the machine control system therebetween. In the first area 14-1, machining is carried out in a first removal phase in such a way that the laser beam is guided by means of variable optical devices 25a over the currently exposed workpiece surface along strips 51. In FIGS. 1 and 3, these strips 51 are partially outlined but not in a fully solid way.

In the embodiment as shown, the strips of the laser beam on the workpiece surface follow approximately the finally desired outer workpiece contour (symbolized by line 15) and are therefore often curved, at least in some areas. As shown, many strips 51 in a layer lie next to one another and one material strip is removed at a time (by evaporation, vapor expulsion of material applied by melting, or combustion/oxidation) by having a laser traveling over them one after the other, so as to initially remove one layer and then in the case of repetition the material is removed in layers.

It is outlined in FIG. 3 that the strips in the area 14-1 corresponding to the first removal phase can be arranged less precisely, which is due to the comparatively high operating speed by means of the laser beam guidance. In the second area 14-2 corresponding to the second removal phase, the laser beam 13 likewise travels over the workpiece surface in strips. In this case, however, the relative movement is not accomplished using the laser beam guidance by means of optical elements 25a (hinged mirror, adjustable mirrors or the like) but by means of the actuation of the control axes 22a, 22b in a suitable and/or necessary way. In this connection, it is outlined in FIG. 3 that these strips are observed more accurately than in the case of optical laser beam guidance since the mechanical beam guidance via the control axes 22 operates very precisely.

All in all, the mode of operation is performed in such a way that the external area 14-1 is removed rather rapidly but not as precisely as finally desired by optically guiding the laser beam while the laser beam is mechanically guided in the internal area 14-2, and therefore the removal is done more slowly but very precisely in accordance with the finally desired accuracy.

The width D2 of the second area 14-2 can correspond to several strips of the laser guidance, e.g. at least two or at least ten strips and/or at most ten or at most 20 strips. The material which is outwards with respect thereto in the area 14-1 is then essentially removed by optical beam guidance.

Figure 2A:
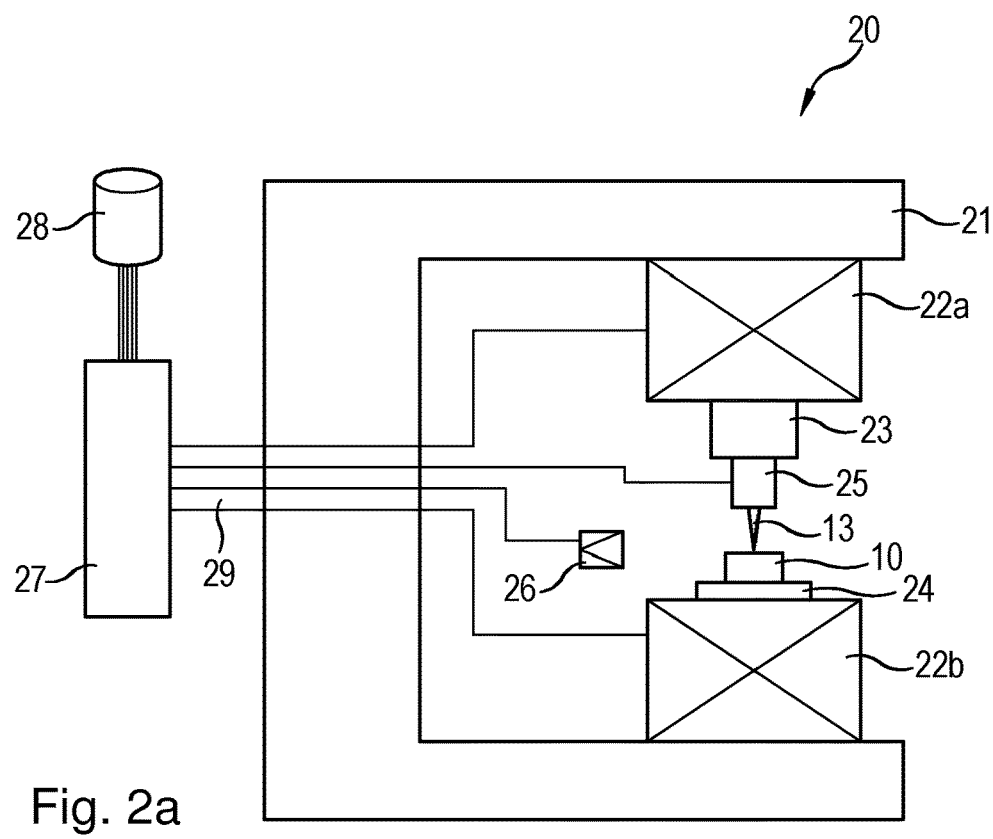
FIG. 2 shows by way of diagram a laser machining machine and a laser tool.
Figure 2B:
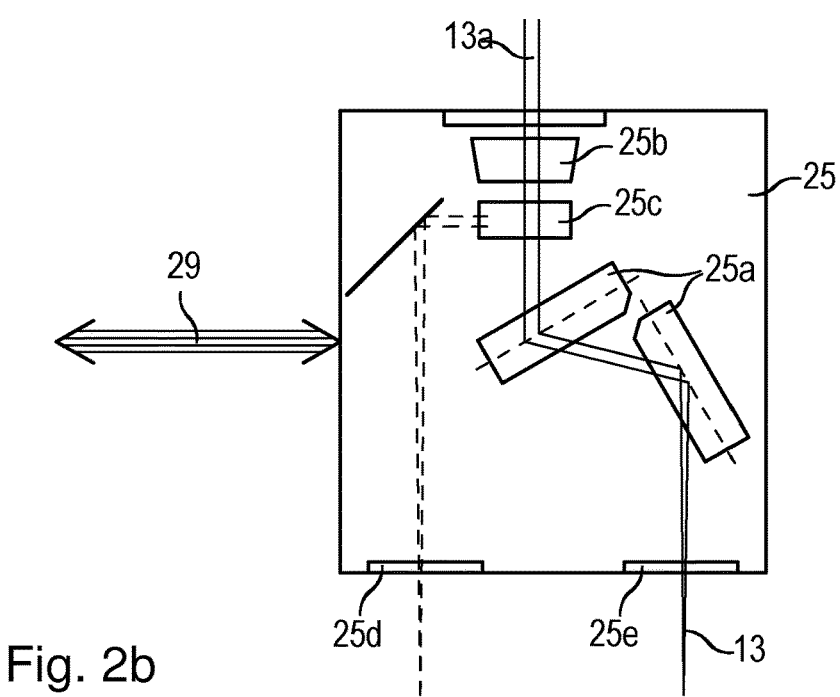

FIG. 2b shows by way of diagram an embodiment of a laser tool. It receives laser light 13a from a laser source (not shown) which can be provided in the tool 25 or outside therefrom. In the laser tool 25, it can initially pass through a focusing device 25b which can be adjusted electronically and by means of which the focus of the laser light can be brought into a desired z-position, in particular on the surface of the material, where it can be held. The focusing device 25b can be "fast" in the sense that the focus position is adjusted at any time in accordance with the current position of the laser spot on the workpiece so as to be followed up in this way. This can be made in controlled fashion or be controlled in accordance with previously adjusted specifications.

Furthermore, a scanning device is provided as optical beam guidance 25a by means of which the laser beam can be deflected in two dimensions. Here, hinged mirrors can be concerned which swivel and/or can be adjustable/controllable, about intersecting, in particular perpendicular, axes. This adjustability can also be fast in the sense that it is thus possible to travel over the desired strips by deflection in the x- and y-directions on the workpiece surface.

On the outlet side/workpiece side, the laser tool 25 can have an opening or a beam outlet window 25e which, in turn, can have a focusing effect or which is only a transparent plate.

In the first removal phase, the variable/adjustable mirrors (or in general the variable optical devices 25a) are controlled by the machine control system 27 in such a way that they effect a guidance of the laser impact point over the surface of the material along the desired strips. In order to obtain coverage of a desired surface area, this can be meandering reciprocal movement or a movement which is directed to one side during the removal and has a blanking or defocused return travel which is optionally markedly faster.

In the second removal phase, the laser light can also run via adjustable mirrors 25a which are then, however, fixed in a predetermined position. Nevertheless, it is also possible to guide the laser light past the hinged mirrors 25a. For this purpose, an optical switch 25c can be provided in the light path above the hinged mirrors 25a and also operates in accordance with the control system 27. In the first operating phase, it guides laser light 13a to the hinged mirrors 25a and in the second operating phase it guides the laser light past them. The laser light which is guided past the hinged mirrors 25a can then be radiated via a further outlet 25d or by suitable devices via the same outlet as mentioned above. Passing the laser light in the second removal phase past the hinged mirrors has the advantage that the hinged mirrors are less loaded by the laser light power and that there is no position noise which the hinged mirrors can also produce in the case of a standstill.

FIG. 4 shows an embodiment which is particularly suitable for the production of workpieces to be formed in many ways. In general, when a workpiece is machined by a tool, the workpiece 10 must be turned towards the tool 25 in a suitable fashion. This also applies to the laser machining operation. In addition, it has to be taken into account in laser machining that the shading of the laser light by the workpiece and unfavorable impact angles of the laser light on the workpiece are to be avoided, if possible. Moreover, it has to be taken into account that the operating window of a laser tool is limited. It is quite possible that the workpiece to be machined is larger than the operating window of the laser tool. In order to meet all these requirements, the procedure outlined by way of diagram in FIG. 4 can be chosen:

FIG. 4a shows by way of diagram a figure which, in turn, corresponds qualitatively to FIGS. 1b and 3. The thick lowermost line in the form of an inverted V symbolizes the machining boundary while the "parallel" lines thereabove symbolize the guidance tracks 51 caused by the laser guidance in a layer during the first and second removal phases.

In this respect, it is pointed out once more that FIGS. 1b, 3 and 4a-e show top views of a single layer to be removed; they do not show a section through several layers to be removed. The parallel lines are no symbolic presentations of several layers but are symbolic presentations of several strips in a layer. Other layers than the respectively one shown has to be conceived as one lying above or below the drawing plane and being parallel thereto.

Considering FIG. 4a, it is evident that it is hardly possible to fully produce it from a single relative position between workpiece 10 and laser tool 25. If the laser tool 25 was placed symmetrically above the apex of the inverted V, the impact point in the apex area of the rounded edge was satisfactory but on the left and right thereof there would be grinding cuts which are unfavorable. If the laser source was moved to the left, it might be possible to find a compromise with respect to the satisfactory machining on the one side of the left branch of the form and the rounded upper part. However, the machining of the right-hand part would be worse or, if shaded, even impossible.

In order to master this problem, a segmentation of the workpiece is made so as to define individual areas 41a, 41b and 41c which seamlessly border on one another or overlap, each of said areas being machined separately. In the case of the optical laser guidance (by means of hinged mirrors 25a), it is then possible to adopt a relative position and relative alignment, selected individually for each area, between workpiece and laser tool, which is favorable for the respective individual area. In FIG. 4b, the individual area boundaries are outlined by lines and the crosses 44a, 44b and 44c indicate respective relative positions of the laser tool 25 for machining the respective individual area.

Furthermore, it is also possible to proceed in such a way that according to the definition of the individual areas 41a, 41b, 41c an individual reference point (defined in three-dimensional fashion) is assigned to each of these individual areas. In FIG. 4c, these reference points of the individual areas are designated by 42a, 42b and 42c. By means of the known clamping of the workpiece in the machine, the machine control system can determine the respective reference points in their position relative to the machine so as to also adjust the relative positioning between reference point 42 of the area respectively considered at that time, on the one hand, and the laser tool 25, on the other hand.

The determination of the individual areas can be made manually or automatically. The determination can also be done in partially automated fashion in such a way that specifications are made manually e.g. as to where there shall be area boundaries or where there shall be no area boundaries and that then the actual determination of the individual areas is done automatically in consideration of the specifications. For example, it is desirable to provide no area boundary in the region of a cutting edge of a workpiece since the production accuracies at individual area boundaries can be less than in the interior of an individual area. Another specification can be that at the end of a planar surface, i.e. where it changes into a curved area, there shall be an area boundary. Further determinations can then be made automatically, e.g. with respect to the size of the operating window of a laser tool, the avoidance of laser shadings by workpiece parts, the avoidance of large distance differences or alignment differences between workpiece surface and laser tool in an individual area.

The assignment of reference points 42 can also be made manually and automatically. When it is made automatically, the reference point can be chosen e.g. as a position of the three-dimensionally defined focus of the material to be removed. In this connection, it is pointed out that FIG. 4c suggests that the reference points are located on the workpiece surface. However, this is extremely rarely the case. They will usually lie in the interior of the workpiece parts to be machined. A translationally defined reference position $x0i$, $y0i$, $z0i$ and a rotatorily defined reference alignment $phi0i$, $psi0i$ are assigned to each reference point. When the relative position is adjusted between the laser tool and the respective individual area, the relative position is adjusted between reference position and laser tool in such a way that the reference alignment has a desired alignment.

During the machining of an individual area 41a, 41b, 41c in the first removal phase, this reference position which is adjusted with the mechanical control axes of the machine is maintained and, on the basis thereof, the laser is guided by means of the variable optical devices (hinged mirrors) 25a over the workpiece surface in the respectively considered individual area until the desired result is achieved. In doing so, the procedure can be that the first removal phase is initially carried out completely for all individual areas. Then, the second removal phase can be made continuously over all individual areas. The fragmentation in individual areas then only applies to the material to be removed in the first removal phase.

However, the second removal phase can also be made individually for the individual areas which can then be considered for the fragmentation as well, e.g. by first removing in an individual area all layers of the first removal phase and then all layers of the second removal phase and thereafter turning to the next individual area. In this connection, it is pointed out that the laser thickness during the removal phase need not necessarily be the same layer thickness as during the second removal phase. Depending on laser parameters, the laser thicknesses can be different. However, it is also possible to proceed in such a way that within a layer the first removal phase is initially carried out with a fixed mechanical relative position between workpiece 10 and laser tool 25 directly one after the other and then the second removal phase is carried out by means of the mechanical control axes 22 with a fixed optical beam guidance and thereafter the removal of the next layer is started.

After defining the reference points 42 for the individual areas 41, in each individual area the necessary amount of data is extracted from the existing workpiece definitions (e.g. CAD data) to create separately manageable machining program parts. These separate parts are indicated by FIGS. 4d1, 4d2 and 4d3. Then, there is also a coordinate conversion for each of the areas to present for the machining operation the respective areas in a suitable coordinate system, adapted in particular to the relative position during the machining. The new coordinate system is indicated by reference sign 43 in FIG. 4e1. The same steps will be taken for the individual areas of FIGS. 4d2 and 4d3. In this way, several separately executable machining programs or control sets are obtained, which are available in suitable coordinates and can then be used in the execution of the respective parts.

The fragmentation into individual areas 41a, 41b, 41c serves for achieving that in particular during the optical beam guidance in the first removal phase there are good machining conditions for all workpiece surface areas, and therefore they can be machined in favorable and efficient fashion.

As already explained, the strip guidance speed v of the laser beam (its impact point on the workpiece surface) can be markedly different between first and second removal phases. During the first removal phase, speeds above 0.5 m/s up to over 8 m/s are a rule while during the second removal phase speeds below 1 cm/s are common practice, and therefore a speed difference by a factor of at least 100 is realistic between the two phases. In order to then adapt the energy input per area element to the required removal output, the laser pulse frequency can be adjusted.

The removal laser light is usually pulsed laser light, e.g. from a solid state laser, e.g. a YAG laser, which do not emit a continuous steady light but individual pulses. Typical pulse frequencies are about 10 kHz or more with an optical beam guidance (speed v>0.5 m/s or >1 m/s or >3 m/s). In order to adapt the energy input per surface area also in the case of the slow mechanical beam guidance to the output necessary for the removal, a correspondingly marked reduction in the pulse frequency is possible.

Figure 5:
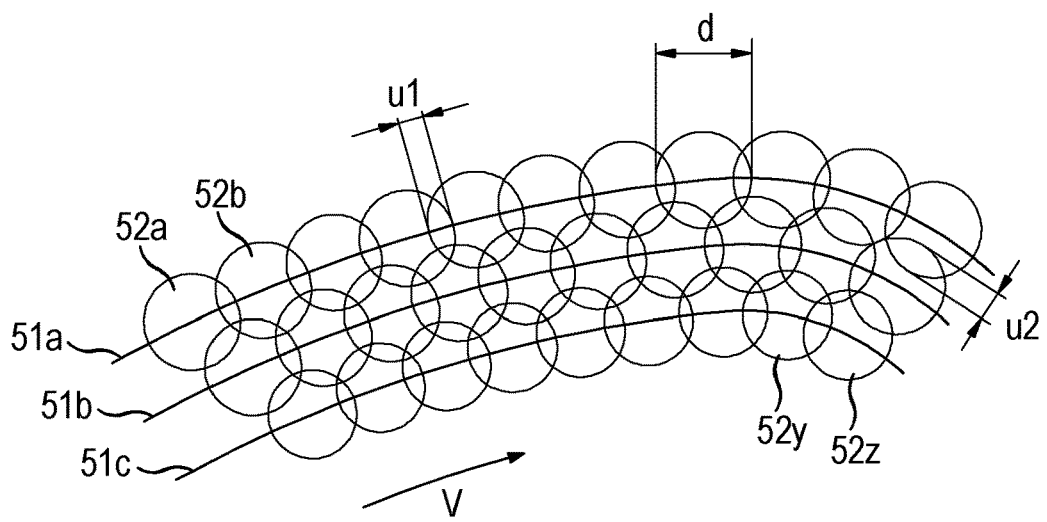
FIG. 5 shows by way of diagram the strip-wise traveling using a pulsed laser.

The energy per pulse can also be adjusted to a certain extent. However, the pulse frequency is adjustable more easily and therefore the energy per pulse does not differ widely in the first removal phase and in the second removal phase (at most a factor of 3 or at most a factor of 2). The essential control parameter for adjusting the energy input per surface area is the pulse frequency. It can be chosen in such a way that the energy input per surface area also obtains the value necessary for the regular removal in the slow mechanical guidance. In this connection, FIG. 5 shows some considerations by way of diagram:

51a, 51b and 51c denote adjacent strips which—as pointed out above—may be straight but do not have to. Circles 52a, 52b, . . . 52y, 52z symbolize impact points of a respective laser pulse on the workpiece surface. Depending on the laser output and focusing, the impact point can have a diameter d of 20 μm, for example. The adjustment of the feed rate v (either optically via the adjustable mirrors 25a or mechanically via the control axes 22a, 22b of the machine 20) and the pulse frequency can be so as to yield a desired overlap u1 in the feed direction. Equal considerations apply with respect to the overlap transversely to the strips, symbolized by the variable u2 in FIG. 5. The overlap u2 transversely to the individual strips is effected by the spatial position of the established strips 51a, 51b.

The control can be such that the overlaps in the first removal phase and in the second removal phase are approximately equal (difference less than a factor of 2). Upper limits of the overlap u1 or u2 can be 40% or 30% or 20% of the diameter d. Lower limits can be 0% or 5% or 10%. The diameter d can have a lower limit of 5 μm or 10 μm or 20 μm and/or an upper limit of 200 μm or 100 μm or 50 μm.

In the mechanical beam guidance of the laser beam during the second removal phase, the pulse frequency control of the laser light can be used to compensate dynamic inaccuracies of the mechanical beam guidance. The mechanical beam guidance requires the (positive or negative) acceleration of masses, which naturally takes a certain time. These effects are usually not negligible since the involved masses can be considerable as it is not only a possibly small workpiece or a laser head which is not too heavy that has to be accelerated but in addition also the respective retainers and supports. On the other hand, the respective dynamic behaviors thereof are known and predictable, and therefore they can also be controlled.

For example, when a rotation about an axis shall be made at a certain desired speed, it will initially be below the desired speed. Correspondingly, it is also possible to select the pulse frequency at a lower rate to keep the energy input per surface area as constant as possible or with the least variance possible. To put it generally, the laser pulse frequency can be made in accordance with the mechanical laser beam guidance, in particular in accordance with dynamic properties (mass, acceleration) of the mechanical system.

A pulse frequency control device can directly control the pulse frequency of the laser source and/or can have a tactile optical gate, by means of which individual pulses or pulse sequences can be blanked or faded down. The latter can be used in particular when the laser energy per surface area has to be adapted to the slow feed in the case of a mechanical beam guidance by means of the mechanical axes 22. Then, in accordance with the considerably slower feed rate of the laser on the workpiece surface it is then possible to blank e.g. 99% or 99.2% or 99.5% of all pulses, and therefore the laser energy is well adjustable.

Figure 6:
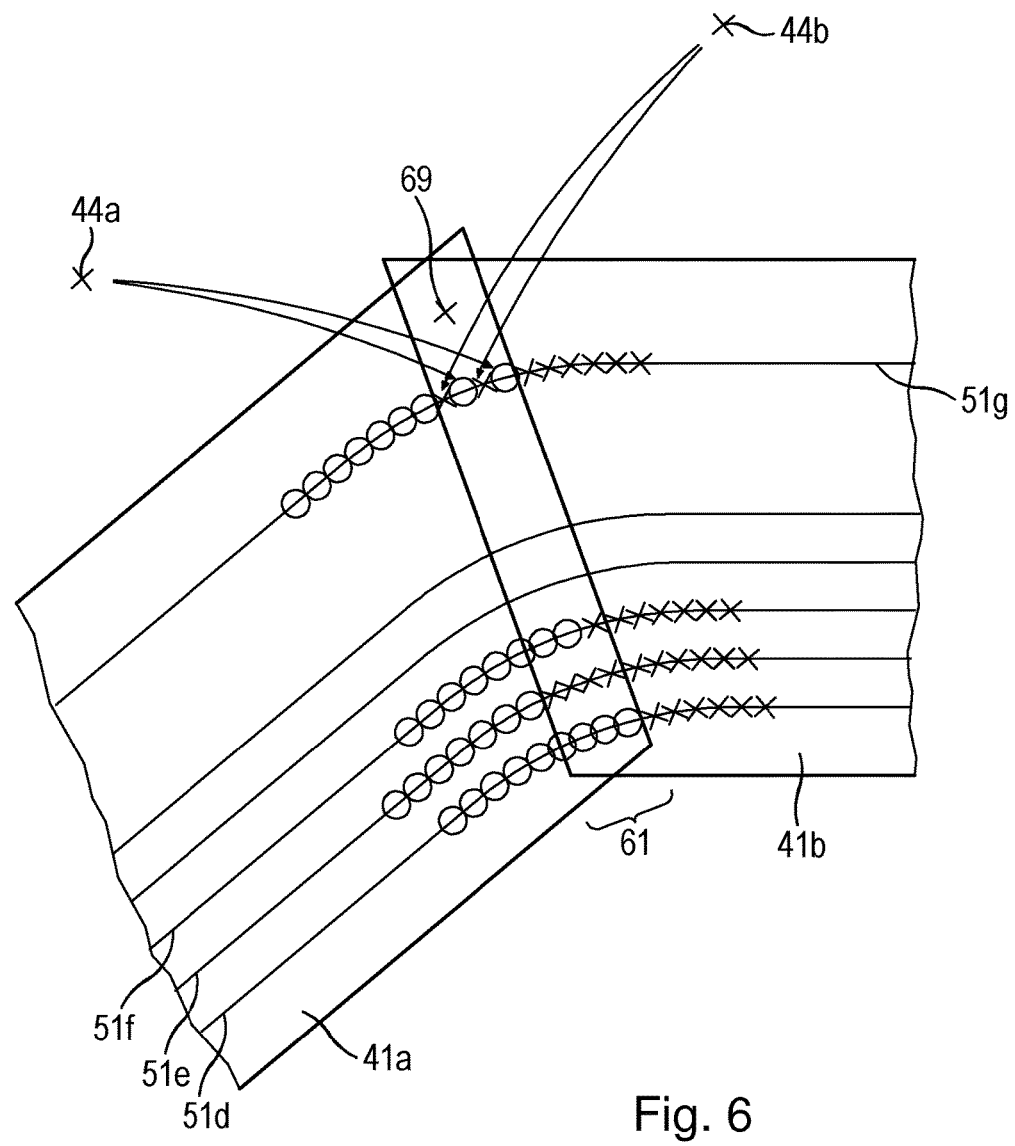
FIG. 6 shows overlapping machining fragments.

FIG. 6 shows an embodiment where individual areas are defined in overlapping manner. The individual areas 41a and 41b overlap in area 61, for example. A single position on the workpiece can be machined from two different relative positions 44a, 44b within the overlapping area 61. In FIG. 6, machining positions (laser pulse impact points) from the relative position 44a are indicated with "o" while machining positions (laser pulse impact points) from the relative position 44b are indicated with "x". For example, position 69 is located in the two individual areas 41a and 41b and can optionally be machined from the first relative position 44a or the second relative position 44b in this way. This can be used to generate in the overlapping area 61 a fluttering transition between the individual areas in such a way that the removal along individual strips is terminated at different points in the feed direction within a single area, wherein the machining operation is then continued from the other relative position to the other individual area. It is thus possible to blur impacts which may result in the transition from one individual area to the other so as to make them less visible.

The strips 51d, 51e and 51f show embodiments in which the removal is ended (51d) along the respective strips once at the very end of the window (viewed from left to right), once clearly before the end but at the very beginning of the overlapping area 61 (strip 51e) and once in the middle of the overlapping area (strip 51f). The machining ends from one relative position 44a are stored strip-wise, and therefore when a machining operation is made from the other relative position 44b, the machining with respect to the stored data can be started correctly strip-wise and can be continued. Instead of storing of concrete positions, it is also possible to store a rule in accordance with which the machining ends are determined from one relative position 44a and the machining beginnings are determined from the other relative position 44b.

It is even possible to proceed in such a way that in a single strip the operation can be performed in interlaced fashion in such a way that positions which are machined from the different relative positions 44a, 44b, are interlaced or "crossed" in the feed direction, as shown in connection with strip 51g. Here, too, the machining points from one relative position 44a are stored strip-wise and position-wise, and therefore when the machining is made from the other relative position 44b, the machining can be started correctly and continued with respect to the stored data.

Instead of storing concrete end or machining positions, it is also possible to store a rule in accordance with which the machining ends are determined from one relative position 44a and the machining beginnings are determined from the other relative position 44b. It is also possible to implement concretely the machining end and beginning points in a machining program and store them as such.

The dimensions of the area overlap 61 can be more than 2% or more than 5% of the dimensions of the area in the feed direction and/or less than 20% or less than 10%, for example.

Figure 7:
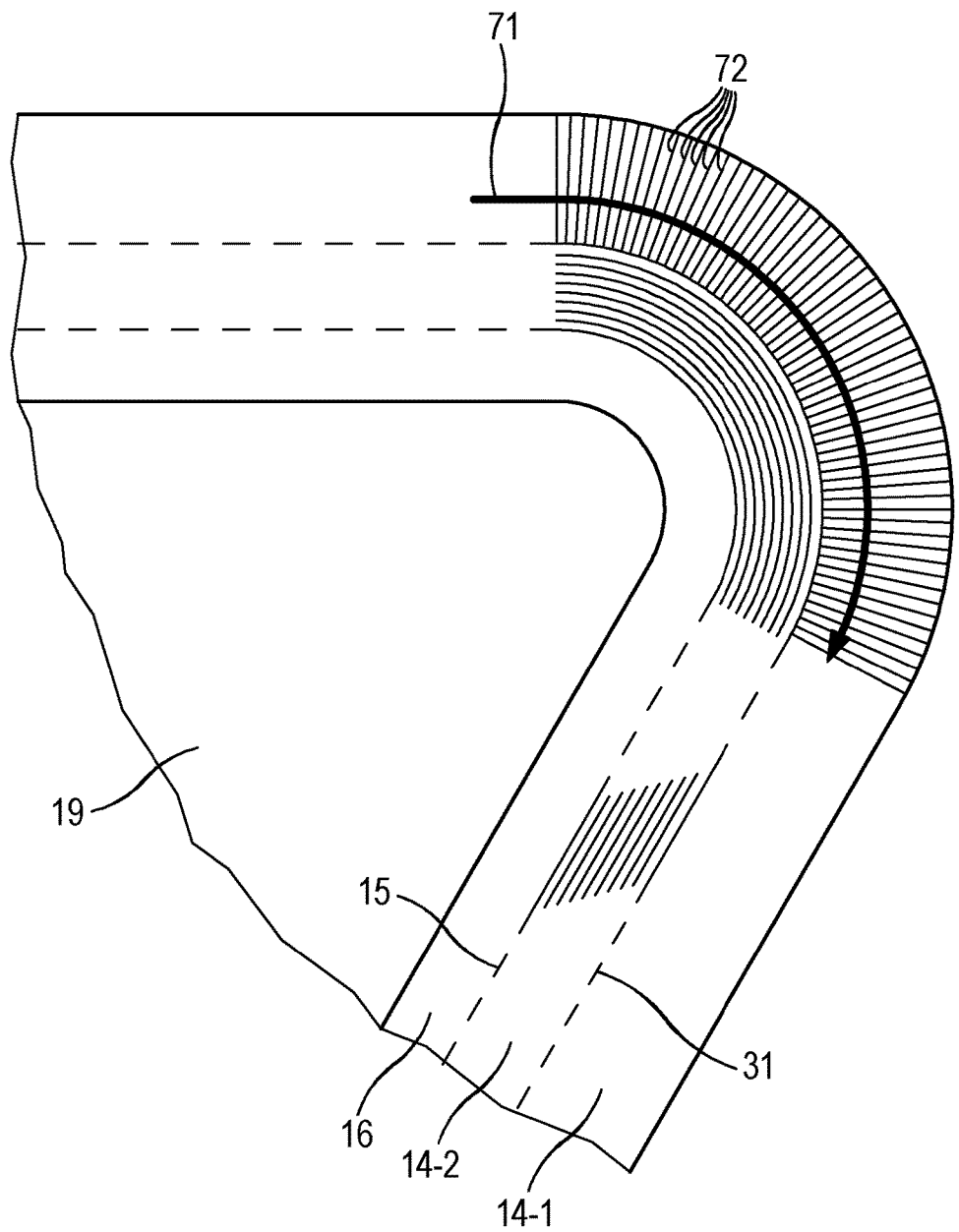
FIG. 7 shows a further embodiment of a two-phase removal method.

FIG. 7 shows a two-phase removal method in which in the first removal phase the optical beam guidance and the mechanical beam guidance are used and in which in the second removal phase only the mechanical beam guidance is used.

In the first removal phase, optical and mechanical beam guidance can be used in such a way that one guides the beam in one direction which intersects the direction in which the other guides the beam. For example, the mechanical beam guidance can guide the beam in parallel (i.e. not intersecting) to the final surface of the workpiece while the optical beam guidance guides the beam in a (current) direction which intersects the (current) direction that results from the mechanical beam guidance.

Arrow 71 in FIG. 7 symbolizes a guidance movement which can be caused by the cooperation of several mechanical control axes while lines 72 outline tracks which a laser follows so as to be guided over the workpiece surface because it receives a composed guidance movement from superposed mechanical beam guidance and optical beam guidance. Neither optical beam guidance nor mechanical beam guidance must be straight.

As pointed out above, the strip speed of the laser spot on the workpiece surface of the optical beam guidance is usually markedly higher than that of the mechanical beam guidance. The mechanical beam guidance can then guide an imaginary reference point relatively slowly along arrow 71 while the optical beam guidance reciprocates the laser beam at a rather high frequency. The laser beam can be activated with respect to the movement both back and forth, or can be blanked or be operated at a very low frequency in one of two ("return travel"). The mechanical guidance movement can be continuous or incremental.

The tracks 72 preferably extend towards the workpiece surface at right angles. However, FIG. 7 shows that in the area of workpiece edges or roundings (concave or convex) there are diversifications of the tracks facing outwards (tracks with a directional component in a radial direction). With otherwise equal control conditions, this would have the consequence that the energy input per surface area changes, is in particular weaker on the radial outside than on the radial inside. This can be compensated by reducing the guidance speed of the optical beam guidance outwards and/or increasing the laser pulse frequency or pulse energy.

The diversification can be avoided or distributed by a suitable adjustment of the directions of the tracks 72 in accordance with the local convexities or concavities of a workpiece. For example, viewed away from the workpiece, they can be inclined towards a convex area or away from a concave area with respect to the direction locally perpendicular away from the workpiece surface, wherein the inclination can be changed depending on the distance from the concave or convex area, in particular it can be reduced the farther the track is away from the concave or convex area. The workpiece geometry permitting, the tracks 72 can also be guided parallel to one another in concave or convex areas.

Figure 8A:
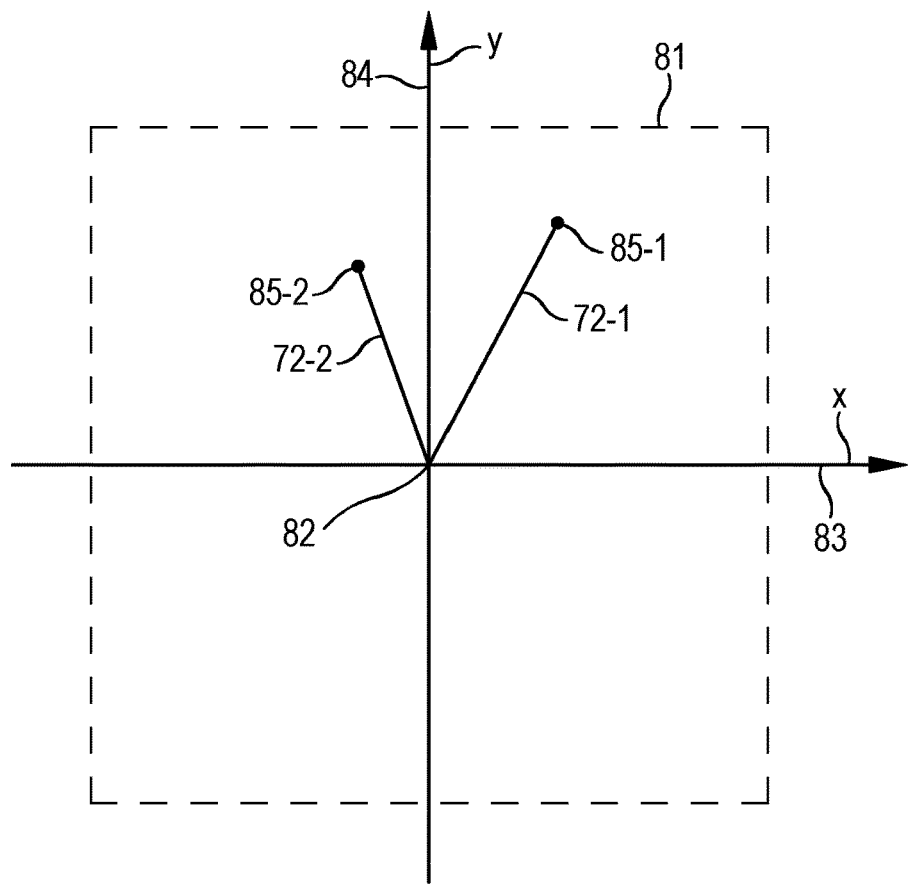
FIG. 8 shows an implementation of the method of FIG. 7.

The determination of the tracks can be made in such a way that all parameters (i.e. control of the mechanical axes and control of the optical components) are determined and stored in advance. An alternative in this case which can be implemented in a comparatively simple fashion is shown by way of diagram in FIG. 8. FIG. 8a symbolizes a coordinate system of the optical beam guidance ("scanner"). 81 denotes the operating windows which can be traveled over (maximum deflections +/− in the x/y directions). 82 stands for a 0/0 point which can be disposed centrally in the operating window and can be defined as a point of intersection of an x-axis 83 and a y-axis 84. The scanner operates in this coordinate system (optical beam guidance—in particular adjustable mirrors 25a and control).

Figure 8B:
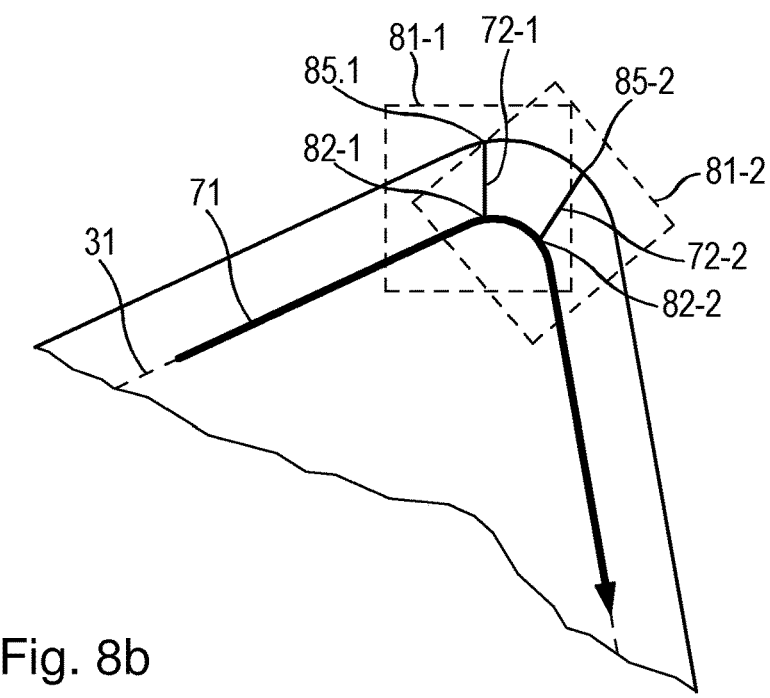

According to FIG. 8b, the mechanical control axes guide the operating window 81 via a movement to be adjusted according to arrow 71, said movement being determined and stored in advance. The tracks 72 to be optically adjusted are, however, determined in real time. The movement 71, which guided in a mechanically translational and rotary fashion, is generated as a movement of a reference point 82 and a reference axis 84 of the scanner coordinate system and can guide e.g. as a reference point the scanner 0/0 point 82 (0/0 in x/y directions) and as a reference axis e.g. the y-axis 84 in such a way that the reference point moves along arrow 71 and the reference axis is always local in a certain direction (e.g. perpendicular) to the workpiece surface. 81-1 and 81-2 show by way of example two current positions adopted consecutively. The movement 71 of the reference point 82 can be made along the boundary 31, for example.

Based on the respectively current reference point 82-1, 82-2, direction and length of the track 72-1, 72-2 to be guided respectively at that time or simply an end point 85-1, 85-2 of the respective track can be determined in the scanner coordinate system in real time. The scanner is then controlled correspondingly. The determination can be made on the basis of the die data.

The mechanical beam guidance uses one or a plurality of the translational and/or rotatory control axes 22a, 22b of the machine at the same time or successively to adjust, change and/or guide the relative position and/or relative alignment of tool 13, 25 and workpiece 10 relative to each other so as to guide the laser beam 13 over the workpiece surface. The optical beam guidance uses adjustable optical elements 25a in the tool 25, e.g. hinged mirrors, to guide the laser beam over the workpiece surface.

In the embodiment of FIGS. 7 and 8, the second removal phase can be designed as described above.

In a real implementation, the mechanical control axes 22 and the optical scanner 25a can have separate controls/feedback controls. A suitable interface for data exchange (both away from the sensors and towards the actuators) can be provided between them, e.g. also in the form of a superior control.

It is pointed out that the track guidance shown in FIG. 7 for the first removal phase is also possible in the first removal phase of the embodiment of FIG. 3; however, in this case it would then be exclusively adjusted by the optical beam guidance.

In a further embodiment, it is possible to further accelerate the workpiece machining operation by dividing the workpiece-distant area of the material to be removed in accordance with the first removal phase (14-1 in FIG. 3) once again into a workpiece-distant area and a workpiece-close area, wherein the workpiece-close area is machined by means of optical laser beam guidance and the workpiece-distant area in another way, e.g. mechanically, erosion or the like.

In the formerly shown embodiments, the stacking direction of the layers is parallel to a workpiece surface, and therefore the removal layers are correspondingly disposed so as to intersect with the workpiece surface (strips 51 and layer 17 in FIG. 1a). With a proceeding layer removal, machining is carried out in this way along the final workpiece surface, and the virtual boundary 31 between the operating areas in accordance with two phases separate each layer into two areas 14-1, 14-2.

However, it is also possible to rather proceed in such a way that the stacking direction of the layers is perpendicular to the workpiece surface, and therefore the removal layers are correspondingly located parallel to the workpiece surface or do not follow planar workpiece surfaces. In FIG. 1a, lines 51 would then indicate individual layers while lines 17 indicate single strips within a layer. Other than shown, the laser beam would impinge on the perpendicular wall 18 and not on the surface 14. With a proceeding layer removal, the machining operation is then carried out so as to move towards the final workpiece surface. The boundary 31 between the operating areas can be located between two layers in accordance with the two phases, and therefore each individual layer is fully disposed in one or the other area in accordance with the first removal phase or the second removal phase. Mixed forms of the two methods are also possible, e.g. one is disposed in one workpiece area and the other in another area.

However, the above described alternatives can also result automatically when the operation proceeds, e.g. when initially ("at the top" of the workpiece) layers are removed parallel to the workpiece surface and in the course (on the "side wall") layers are removed, the stacking direction of which is parallel to the wall.

It is pointed out that both the mechanical beam guide and the optical beam guide can make controls in the three-dimensional space. To put it differently, individual tracks and layers need not be disposed in a straight plane. The optical scanner can be controlled by controlling the focus position using a z-shifter 25b in the z-direction. The mechanical beam guidance can have at least one corresponding axis.

Other than described thus far, the laser beam can be slowed down in the second removal phase by means of variable optical devices (optical beam guidance) and can be guided more accurately with respect to the first removal phase for this reason alone. Therefore, this corresponds to a second removal phase during which the laser beam is guided over the workpiece surface by means of variable optical devices relative to the workpiece, wherein the strip guidance speed of the laser impact point on the workpiece is reduced with respect to that in the first removal phase.

Then, other adaptations, e.g. in the laser control, can be made, in particular to adapt the power or energy input into the workpiece surface to the reduced strip guidance speed and to increase the accuracy of the strip guidance in the second phase. Pulse energy and frequency can be adapted (reduced). In the electric circuit, variable or switchable filters can be provided and thus filter adaptations compared to the first removal phase can be made during the second removal phase to filter out signal parts which have a relatively high frequency and are no longer required and thus undesired. It is also possible to use other (more precise) elements on the electro-optical interface for beam guidance (e.g. adjustable mirrors). It is also possible to carry out a calibration between control signals and laser impact points.

The strip speed of the laser impact point on the workpiece surface in the second removal phase can be reduced with respect to the first removal phase by a factor of at least 5 or 10 or 20 or 50 or 100. The boundary frequency of the signals supplied to the electromechanical activators can be reduced by a factor of at least 5 or 10 or 20 or 50 or 100 by suitably changing, activating or deactivating electric filters. The pulse frequency can also be reduced by a factor of at least 5 or 10 or 20 or 50 or 100.

During a thus operating second removal phase, the laser beam can also be guided in overlapping fashion by means of one or a plurality of control axes of the machine relative to the workpiece over the workpiece surface, e.g. continuously or incrementally. The beam guidance by means of one or a plurality of control axes of the machine relative to the workpiece can be done simultaneously with or alternately to the optical laser beam guidance. Only one or a plurality of rotatory control axes and/or one or a plurality of translational control axes or translational and rotatory control axes can be used.

The control can be designed to implement the above described features of the second removal phase, in particular by inducing the laser light source to provide a reduced output and/or pulse frequency and/or the beam guidance elements to provide a slower mode of operation/beam guidance.

The above described features of the embodiment of the second removal phase with a slowed-down use of the optical beam guidance can also be used, instead of in the second removal phase, in a removal phase between the first and second removal phase which then uses exclusively mechanical control axes for the beam guidance.

The workpiece can be or have a metallic or ceramic or other workpiece, optionally also consisting of a plurality of said materials. The material can also be or have glass or a plastic material. It can also be a (CVD or PKD) diamond layer. It can be a composite material. It can be a cutting tool to be produced, in particular a composite tool having a metallic core and a diamond coating present at least in some areas.

The dimensions of the operating window of the machine, which is defined by the laser deflectability, on the workpiece can be less than 30 cm, less than 20 cm, less than 15 cm or less than 10 cm in each dimension. It can be greater than 2 cm, greater than 5 cm, greater than 10 cm or greater than 15 cm in each dimension. A workpiece can be greater than an operating window and can then be traveled over by means of operating window displacement using the mechanical control axes of the machine.

Features which are presented in this description shall also be regarded as being combinable with one another, although this is not stated expressly, unless the combination is not allowed for technical reasons. Explanations on the method steps and method features and method options shall also be comprehended as explanations on device parts or device options which implement the respective method aspect and vice versa.

The invention claimed is:
1. A method for machining a workpiece to form a final surface thereof using a machine comprising a laser tool for emitting a pulsed laser beam, and a controller configured to control the machine to machine the workpiece with the pulsed laser beam to one or more of evaporate and combust workpiece material, wherein the method includes the controller controlling the machine to:
- in a first removal phase, guide the pulsed laser beam over the exposed workpiece surface in strips that lie next to one another in a sequential manner to successively ablate single lines of the exposed workpiece surface until a single layer of the exposed workpiece surface comprising a plurality of strips is ablated, wherein the plurality of strips extend along a same even or uneven plane and each layer is on a different plane; and
- wherein the controller is configured to guide the laser beam in relation to the workpiece over the exposed workpiece surface in the first removal phase using variable optical devices comprising adjustable mirrors inside the laser tool, and
- in a second removal phase following the first removal phase, ablate further layers from the exposed workpiece surface by guiding the pulsed laser beam over the exposed workpiece surface in strips, wherein the controller is configured to guide the laser beam in relation to the workpiece over the exposed workpiece surface in the second removal phase using one or a plurality of control axes of the machine, without the laser beam being simultaneously guided by the variable optical devices;
- wherein the first removal phase is used for the removal of layers which are distant from a final surface of the workpiece and the second removal phase is used for the removal of layers which are adjacent to the final surface of the workpiece.

2. The method according to claim 1, wherein the controller is configured to guide the laser beam over the exposed workpiece surface in the first removal phase at a higher strip guidance speed than in the second removal phase, wherein a difference in strip guidance speed is a factor of more than 10, and
- wherein the strip guidance speed is one or more of above 1 m/s in the first removal phase and below 0.1 m/s in the second removal phase.

3. The method according to claim 1, wherein before the first removal phase begins volumes to be removed from the workpiece are divided into several adjoining individual areas and the individual areas are removed one after the other by initially adjusting for each of the areas a defined reference position between the workpiece and the individual area by means of mechanical control axes and by carrying out, on the basis of this reference position, the first removal phase and the second removal phase inside the respective individual area,
- wherein a reference point is assigned to each individual area and the reference position is adjusted by adjusting a certain relative position between the reference point and the laser tool, wherein the reference point can have a translationally defined reference position (x0$i$, y0$i$, z0$i$) and a rotatorily defined reference alignment (phi0$i$, psi0$i$), and wherein the reference position can be a translationally and rotatorily defined relative position in accordance with the reference point,
- wherein the individual areas are determined by one or more of:
  - setting machining boundaries relative to a reference position in an operating field of the laser tool,
  - identifying laser shadings by workpiece parts or material residues,
  - identifying area boundaries at certain surface areas of the workpiece,
  - identifying large distance differences between the laser tool and the exposed workpiece surface and/or alignment differences of workpiece surface parts within a reference position.

4. The method according to claim 1, wherein the strips along which the laser beam is guided by the controller during the first removal phase and the second removal phase correspond to a contour of a final workpiece.

5. The method according to claim 1, wherein a stacking direction of the layers is parallel to the workpiece surface.

6. The method according to claim 1, wherein, in the second removal phase a plurality of the variable optical devices are kept constant or that in the second removal phase the laser beam bypasses a plurality of the variable optical devices.

7. The method according to claim 1, wherein in the second removal phase the controller is configured to control a pulse frequency of the laser beam based on at least one property of the mechanical control axes of the machine, which are actuated during the second removal phase.

8. The method according to claim 1, wherein a stacking direction of several or all layers is perpendicular to the workpiece surface or that the removal layers are parallel to a final workpiece surface or follow the latter at a distance.

9. The method according to claim 1, wherein
- in the first removal phase only optical beam guidance is used; and
- in the second removal phase only mechanical beam guidance is used.

10. The method according to claim 1, wherein
- in the first removal phase optical beam guidance and mechanical beam guidance are used to guide the laser beam in a direction which intersects a direction in which the other guides the laser beam and wherein the mechanical beam guidance guides the laser beam parallel to a final surface of the workpiece, and wherein
- in the second removal phase only the mechanical beam guidance is used.

11. The method according to claim 1, wherein
- during the first removal phase and the second removal phase the controller is configured to guide the pulsed laser beam over the exposed workpiece surface along adjacent strips, where the adjacent strips overlap,
- the laser beam is pulsed laser light, a pulse frequency of which is adjusted by the controller in accordance with a strip speed of the laser beam on the workpiece to produce an overlap of, or a desired distance between, impact spots of the laser beam on the exposed workpiece surface, and
- the workpiece is a cutting tool, the surface of which is provided with a CVD or PKD diamond coating.

12. The method of claim 1, where the plane of the plurality of strips is substantially perpendicular to a plane of the pulsed laser beam and the plurality of layers extend along an axis that is substantially parallel to the plane of the pulsed laser beam.

* * * * *